United States Patent Office 2,919,291
Patented Dec. 29, 1959

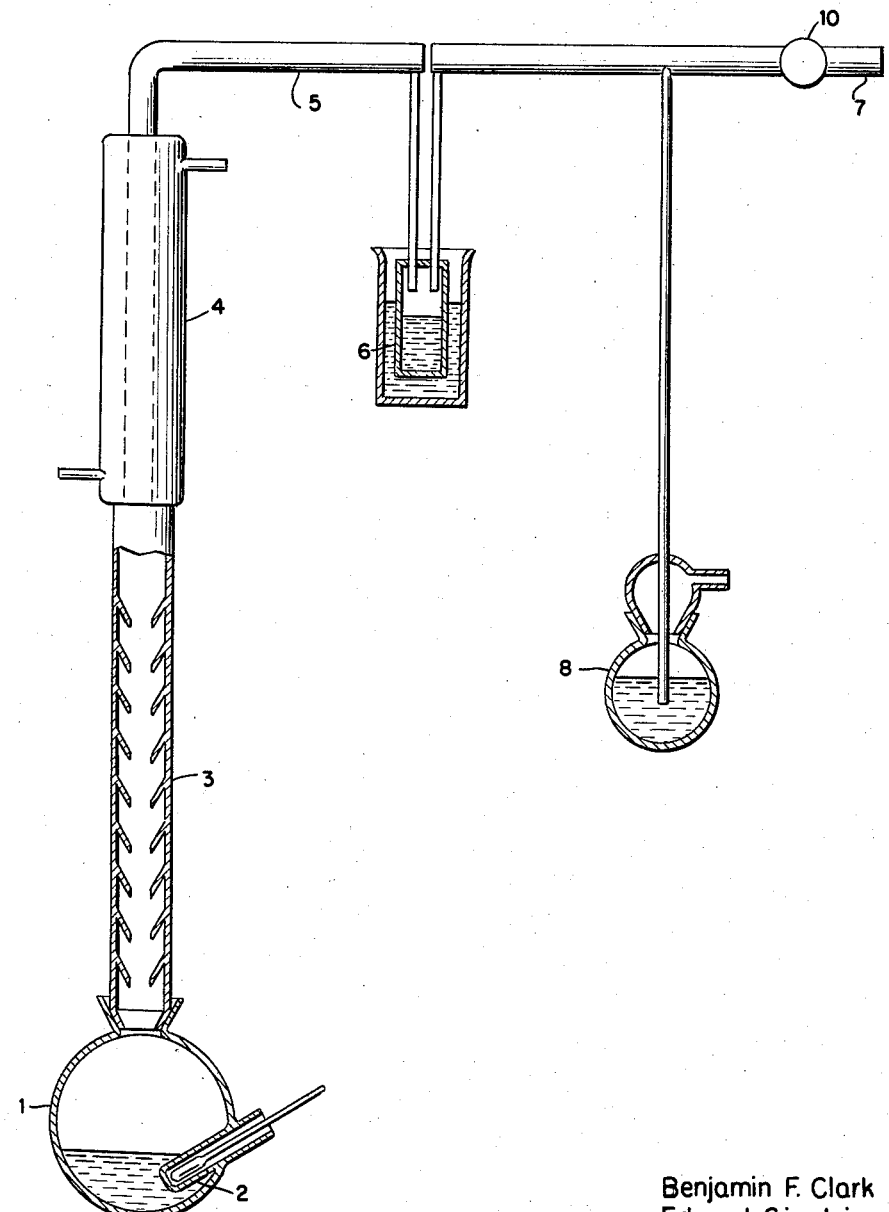

2,919,291

PREPARATION OF CHLOROBIS(2-CHLOROVINYL) BORANE

Benjamin F. Clark, Hamden, Edward Gipstein, New Britain, Mark A. Higgins, Wallingford, and Perry R. Kippur, Hamden, all in Connecticut, assignors to Olin Mathieson Chemical Corporation Application February 20, 1958, Serial No. 716,511

1 Claim. (Cl. 260—543)

This invention relates to a method for the preparation of chlorobis (2-chlorovinyl) borane from dichloro (2-chlorovinyl) borane.

Chlorobis (2-chlorovinyl) borane is a useful chemical compound in that it can be converted to tris (2-chlorovinyl) borane as described in the application of Benjamin F. Clark et al., Serial No. 716,513, filed of even date herewith and entitled "Preparation of Tris (2-Chlorovinyl) Borane." In accordance with the method of this invention, the desired chlorobis (2-chlorovinyl) borane $(ClC_2H_2)_2BCl$ is prepared by heating dischloro (2-chlorovinyl) borane in liquid phase at a temperature within the range from 100° C. to 125° C. while in contact with activated carbon, and removing boron trichloride formed from the reaction mixture. The activated carbon can be derived from, for example, wood, peat, lignite, nut shells, bones and so forth. In carrying out the reaction, the use of temperatures above 125° C. is to be avoided, since above that temperature the formation of tris (2-chlorovinyl) borane begins. That compound is strongly absorbed by the carbon so that it cannot be removed by ordinary methods and its absorption by the carbon destroys the ability of the carbon to promote the disproportionation of the dichloro (2-chlorovinyl) borane to chloro bis (2-chlorovinyl) borane.

The following example illustrates but does not limit the practice of this invention.

EXAMPLE

The apparatus utilized in this experiment is shown in the accompanying drawing. It consisted of a one-liter round-bottom flask 1 which was equipped with the thermo well 2 and which was attached to the bottom of a 17-inch Vigreau column 3 of about 25 mm. inside diameter. Superimposed above the Vigreau column, and attached to it, was a 12-inch water-cooled condenser 4 which was connected to an outlet manifold 5. The manifold was connected to a trap 6, maintained at −80° C., into which the boron trichloride produced during the reaction was allowed to condense. The manifold 5 was equipped with an inlet 7 and valve 10 for introducing nitrogen into the reaction system, and was also connected to a mercury bubble-off 8 to prevent a build-up of excessive pressure in the system.

A total of 5 gram moles of dichloro (2-chlorovinyl) borane was charged to the one-liter round-bottom flask and 200 cc. of activated wood charcoal granules of 4–6 mesh per linear inch size were then added. The flask was attached to the Vigreau column and the contents of the flask were heated to reflux temperature (100° C.). Heating was continued at reflux for about 19.5 hours, and during this time the pot temperature rose slowly from 100° C. to 125° C. The water-cooled condenser was maintained at a temperature of 15°–20° C. and the boron trichloride produced in the disproportionation reaction (2.63 moles) was condensed in the trap maintained at −80° C. During this phase of the reaction the nitrogen inlet was closed by means of valve 10. By maintaining the temperature of the condenser between 15°–20° C., the boron trichloride was permitted to escape and almost complete return of the dichloro (2-chlorovinyl) borane to the flask was achieved by the condensing action. At the end of the heating period, the nitrogen inlet valve 10 was opened, and the system was allowed to cool to room temperature. After the mixture had cooled to room temperature under an atmosphere of nitrogen, the supernatent liquid was decanted into a distillation flask and the liquid subjected to a reduced pressure distillation. The results of this distillation were as follows:

Product composition

| Moles Charged $ClC_2H_2BCl_2$ | Moles $ClC_2H_2BCl_2$ | Moles $BCl_3$ | Moles $(ClC_2H_2)_2BCl$ | Residue (gms.) |
|---|---|---|---|---|
| 5.0 | 0.72 | 2.63 | 0.98 | 10 |

129 gms. of material remained absorbed on the carbon. In the distillation operation the dichloro (2-chlorovinyl) borane was distilled over at a temperature of 35° C. under a pressure of 70 mm. of Hg absolute and the chlorobis (2-chlorovinyl) borane was distilled over at a temperature of 32° C. at 2 mm. of Hg of pressure absolute.

It is claimed:

A method for the preparation of chlorobis (2-chlorovinyl) borane which comprises heating dichloro (2-chlorovinyl) borane in liquid phase at a temperature within the range from 100° C. to 125° C. while in contact with activated carbon while removing boron trichloride formed from the reaction mixture.

No references cited.